United States Patent
DeLuca, Jr. et al.

(10) Patent No.: US 7,014,700 B2
(45) Date of Patent: Mar. 21, 2006

(54) HIGHLY REFLECTIVE INTERFERENCE PIGMENTS WITH DARK ABSORPTION COLOR

(75) Inventors: Carmine V. DeLuca, Jr., Peekskill, NY (US); William Howard, Poughquag, NY (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 10/755,242

(22) Filed: Jan. 13, 2004

(65) Prior Publication Data

US 2005/0154082 A1   Jul. 14, 2005

(51) Int. Cl.
*C09D 11/00* (2006.01)
*C09C 1/36* (2006.01)

(52) U.S. Cl. ............. 106/415; 106/416; 106/417; 106/436; 106/31.9

(58) Field of Classification Search ........ 106/415–417, 106/436; 428/403–404
See application file for complete search history.

(56) References Cited

U.S. PATENT DOCUMENTS

| | | | |
|---|---|---|---|
| 3,087,827 A | | 4/1963 | Klenke et al. |
| 3,087,828 A | | 4/1963 | Linton |
| 3,087,829 A | | 4/1963 | Linton |
| 3,418,146 A | | 12/1968 | Rieger et al. |
| 3,437,515 A | | 4/1969 | Quinn et al. |
| 4,038,099 A | | 7/1977 | DeLuca et al. |
| 4,192,691 A | * | 3/1980 | Armanini ................ 106/417 |
| 5,286,291 A | | 2/1994 | Bernhardt et al. |
| 5,356,471 A | | 10/1994 | Reynders |
| 5,401,306 A | | 3/1995 | Schmid et al. |
| 5,611,851 A | * | 3/1997 | DeLuca et al. ........... 106/415 |
| 5,662,738 A | | 9/1997 | Schmid et al. |
| 5,693,135 A | * | 12/1997 | Schmid et al. ........... 106/417 |
| 5,985,020 A | | 11/1999 | Andes et al. ............ 106/415 |
| 6,139,614 A | | 10/2000 | Schmid et al. |

* cited by examiner

*Primary Examiner*—Helene Klemanski
(74) *Attorney, Agent, or Firm*—Melanie L. Brown

(57) ABSTRACT

Highly reflective interference effect pigments with dark absorption color are obtained by reducing platy titanium dioxide.

The present effect pigments may be used in cosmetics, plastics, inks, and coatings including solvent and water borne automotive paint systems.

16 Claims, No Drawings

HIGHLY REFLECTIVE INTERFERENCE PIGMENTS WITH DARK ABSORPTION COLOR

BACKGROUND OF THE INVENTION

The use of effect pigments, also known as pearlescent pigments or nacreous pigments, in order to impart a pearlescent luster, metallic luster and/or multi-color effect approaching iridescent, is well known. The effect pigments are composed of a plurality of laminar platelets, each of which is coated with one or more reflecting/transmitting layers. Pigments of this type were first based on metal oxides, as described in U.S. Pat. Nos. 3,087,828 and 3,087,829, and a description of their properties can be found in the *Pigment Handbook*, Volume I, Second Edition, pp. 829–858, John Wiley & Sons, NY 1988. More recently, use of other coating layers to realize optically variable effects have been developed.

The unique appearance of effect pigments is the result of multiple reflections and transmissions of light. The platelet substrate usually has a refractive index which is different from the coating and usually also has a degree of transparency. The coating is in the form of one or more thin films which have been deposited on the surfaces of the platelets.

The addition of the coatings to a platelet so that the luster, color and color homogeneity are maintained is a very complex process and originally, the only platy substrate which achieved any significant use in commerce was mica. Thus, historically, the largest class of effect pigments based on thin film interference were those based on a mica substrate. With the advent of synthetic substrates, e.g. synthetic mica, aluminum oxide, silica, and glass, it became evident that other substrates could be used since each substrate itself contributes certain effect attributes, due to variations in transparency, refractive index, bulk color, thickness, and surface and edge features. Coated substrate effect pigments thus provide different, albeit similar, visual effects when they are identical except for the identity of the material of the substrate because of these considerations.

One of the most important of the effect pigments which is encountered commercially today is titanium dioxide-coated mica, a pigment which is composed of a mica platelet having an adherent coating of crystalline titanium dioxide thereon. The color which is exhibited is a function of the thickness of the coating. The effect pigment has good reflectivity characteristics, high stability to heat and chemical agents and is non-toxic. The titanium dioxide may be in the anatase form as described, for example, in U.S. Pat. Nos. 3,087,827, 3,087,828, 3,418,146 and 3,437,515, or in the rutile crystalline form as described in U.S. Pat. No. 4,038,099.

The metal oxide on the mica substrate has a high refractive index and provides the optical effects, including high luster and reflectivity, coverage, interference reflection color if the metal oxide coating is sufficiently thick, and absorption color if the metal oxide contains a color material. The mica, on the other hand, has a low refractive index and essentially functions solely as a carrier substrate making almost no contribution to the optical effect which is realized. The metal oxide-coated substrate pigments do not present dark absorption colors.

Lustrous interference pigments, presumably dark, have been prepared using chemical vapor deposition techniques as described in the European Patent Nos. 0579091 and 0571836.

A description of the production of dark, in particular black, surface coatings is found in U.S. Pat. No. 5,356,471. This result is achieved by coating a platelet-like substrate with a silane followed by pyrolysis, for example at temperatures which preferably are greater than 700° C. in a non-oxidizing, preferably inert, gas atmosphere. The process leads to the formation of a layer on the surface of the pigment which contains black $SiO_2$ glass containing silicon oxycarbide and/or carbon black. In U.S. Pat. No. 5,286,291, a pigment containing carbon black is achieved by fixing the carbon black on a substrate by means of a surfactant and organic silane compound. The products of these patents are usually characterized by being low in reflectivity and poor in color purity. The use of carbon black is not a very efficient process because the majority of the platelets being treated may not be coated properly. As a result, the above noted methods are characterized by increased production costs, being difficult to precisely control and involving multiple steps.

There is, accordingly, still a need for highly intense interference effect pigments with a dark absorption color which can be made by a simple and cost effective process. It is the object of that invention to provide such pigments and a process by which they may be prepared.

SUMMARY OF THE INVENTION

This invention relates to highly reflective interference pigments which have a dark absorption color. Such pigments have been surprisingly achieved by reducing the surface of a platy or self-supporting titanium dioxide platelet. Thus, the present invention provides an effect pigment comprising platy titanium dioxide that is substantially substrate-free and has a surface comprising reduced titanium oxide.

Although the reduction of known $TiO_2$-containing pigments has heretofore been shown to generate dark absorption pigments (See BASF PALIOCROM® Blue Silver L 6000 pigment reported to be 70–75 percent mica coated with 21 weight percent reduced $TiO_2$ and tin.), the pigments of this invention are significantly different in that they are substantially substrate-free (as defined below) and unexpectedly maintain their high degree of color purity and reflectivity through the color spectrum of gold to green following the reduction treatment. Before the present invention, it was observed that the color and brilliance were lost as the degree of reduction increases, especially with mica-based pigments, to the extent that interference quality was compromised. However, when employing the self-supporting or platy $TiO_2$ of the present invention, this quality loss is negligible, resulting in a product with high opacity, excellent color, and reflectivity. In addition, and even more unexpectedly, the pigments of this invention not only maintain their original interference look but actually appear to advance in optical thickness as the reduction process intensifies. Thus, e.g., a self-supporting yellow $TiO_2$ will move from yellow to deep gold to olive green. By controlling the degree of titanium dioxide reduction, various dark absorption shades can be obtained without compromising reflection or color purity. Thus, an interference effect pigment with a dark absorption color of superior reflection and color purity can be achieved or the reduction can be carried out so that the resulting color pigment is completely opaque with a metallic look.

DESCRIPTION OF THE INVENTION

In accordance with the present invention, platy titanium dioxide platelets are subjected to reduction.

As used herein, the phrase "platy $TiO_2$" or "self supporting $TiO_2$" is as described, for instance, in commonly assigned U.S. Pat. Nos. 4,192,691 and 5,611,851 incorporated herein by reference in their entireties.

As used herein, the phrase "substantially substrate-free" means containing less than about 20 weight percent of substrate based on the total weight of the effect pigment.

U.S. Pat. No. 4,192,691 employs an aqueous solution of hydrofluoric acid and a mineral acid such as sulfuric acid to dissolve the mica from the pigment. It also discloses and illustrates the use of this dissolving agent to remove the mica from a titanium dioxide-coated mica having a surface layer of either iron or chromium oxide. U.S. Pat. No. 5,611,851 employs a combination of a mineral acid and phosphoric acid followed by an extractive dissolution using an alkali. Although the procedure of U.S. Pat. No. 5,611,851 is preferred, other procedures can be employed to obtain the titanium dioxide platelets used in the present invention. For instance, titanium dioxide platelet types suitable for use in this invention can be prepared by removing gypsum from $TiO_2$-coated gypsum or by burning off graphite from $TiO_2$-coated graphite. Dissolving glass from a $TiO_2$-coated glass base also provides a substrate useful in this invention as do various web techniques. Although there are several avenues for preparing the $TiO_2$ platelets which then can be coated further, the $TiO_2$ substrate of U.S. Pat. No. 5,611,851 is still preferred in order to obtain maximum reflectivity and color purity. Initially using a substrate aids in producing the relatively smooth and regular titanium dioxide surfaces needed to achieve high quality effect pigments, and the subsequent removal of the mica (refractive index 1.5) or other substrate and its replacement with air (Rf 1.0), allows the benefit of the refractive index of $TiO_2$ (2.6–2.9) to be more fully realized. A useful platy $TiO_2$ is commercially available from Engelhard Corporation.

The platelets of titanium dioxide used in the present invention generally have an average longest dimension of about 1 to about 75 $\mu$m, and preferably about 2 to about 35 $\mu$m. The platelets can have a thickness of about 5 to about 600 nm, and such thickness is more preferably about 20 to about 400 nm. The $TiO_2$ is preferably in the rutile crystalline form but can also be in the anatase form.

The use of platy $TiO_2$ that is substantially substrate-free provides useful effect pigments and it is possible to further decrease the amount of substrate present in the effect pigment. However, the need to eliminate so much of the substrate adds to the manufacturing cost. Also, because the center of the platy $TiO_2$ is essentially hollow, the pigment tends to be more fragile which, in turn, tends to complicate its use in applications where the pigment is subjected to more rigorous conditions. Thus, the present substantially substrate-free pigment is useful in certain applications requiring a sturdier pigment such as automotive paints. The platy $TiO_2$ is used preferably at less than about 40 weight percent of substrate based on the total weight of the effect pigment and more preferably at less than about 20 weight percent of the effect pigment.

In order to achieve the effect pigments of the present invention, the platy titanium dioxide is subjected to the action of a reducing agent for a time and under conditions which cause the surface of the platelets to become reduced. For example, the titanium dioxide platelets can be heated in a reducing gas atmosphere.

Typical reducing gases include ammonia, hydrogen, volatile hydrocarbons and mixtures thereof. Such reducing agents are preferably used in admixture with an inert gas such as nitrogen. The reduction is preferably carried out at an elevated temperature of about 675–850 C. when ammonia is used as the reducing agent and higher temperatures are generally used when ammonia/hydrocarbon mixtures are employed. Depending on the desired degree of reduction, temperature and residence time can be varied so that either a highly reflective, color pure pigment with a dark absorption color or a completely opaque pigment can be prepared. The degree of reduction can be quantified by spectrophotometric methods to determine color purity and degree of reflectivity/absorption. Opacity values can be determined by measuring film thickness on a spray panel that equates to hiding values. In general, the thickness of reduced material needed for a given degree of hiding is inversely proportional to the opacity. Thus, as the material becomes more opaque, a thinner reduction layer is needed for complete hiding compared to a control substance such as Al flakes. The reduction process leads to the formation of reduced titanium species having oxidation states of less than 4, such as $Ti_3O_5$, $Ti_2O_3$ and TiO.

The reduced platy titanium dioxide pigments of the present invention are quite different from reduced titanium dioxide-coated mica, such as those commercially available under the name PALIOCROM® pigment (BASF), as well as other $TiO_2$-coated substrate pigments. Illustrative of such other pigments are those based on titanium dioxide-coated silicate platelets which have been heated in the reducing atmosphere and contain a colorless coating having a refractive index of up to 1.8 covered by a colorless coating having a refractive index of at least 2.0, such as titanium dioxide, which are described in U.S. Pat. No. 6,139,614.

The resulting pigment can be used in any application for which effect pigments have been used heretofore such as, for instance, in cosmetics, plastics, inks and coatings including solvent and water borne automotive paint systems. Products of this invention have an unlimited use in all types of automotive and industrial paint applications, especially in the organic color coating and inks field where deep color intensity is required. For example, these pigments can be used in mass tone or as styling agents to spray paint all types of automotive and non-automotive vehicles. Similarly, they can be used on all clay/formica/wood/glass/metal/enamel/ceramic and non-porous or porous surfaces. The pigments can be used in powder coating compositions. They can be incorporated into plastic articles geared for the toy industry or the home. These pigments can be impregnated into fibers to impart new and esthetic coloring to clothes and carpeting. They can be used to improve the look of shoes, rubber and vinyl/marble flooring, vinyl siding, and all other vinyl products. In addition, these colors can be used in all types of modeling hobbies.

The above-mentioned compositions in which the compositions of this invention are useful are well known to those of ordinary skill in the art. Examples include printing inks, nail enamels, lacquers, thermoplastic and thermosetting materials, natural resins and synthetic resins. Some non-limiting examples include polystyrene and its mixed polymers, polyolefins, in particular, polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile.

For a well-rounded introduction to a variety of pigment applications, see Temple C. Patton, editor, The Pigment Handbook, volume II, Applications and Markets, John Wiley and Sons, New York (1973). In addition, see for example, with regard to ink: R. H. Leach, editor, The Printing Ink Manual, Fourth Edition, Van Nostrand Reinhold (International) Co. Ltd., London (1988), particularly pages 282–591; with regard to paints: C. H. Hare, Protective Coatings, Technology Publishing Co., Pittsburgh (1994), particularly pages 63–288. The foregoing references are hereby incorporated by reference herein for their teachings of ink, paint and plastic compositions, formulations and vehicles in which the compositions of this invention may be used including amounts of colorants. For example, the pigment may be used at a level of 10 to 15% in an offset lithographic ink, with the remainder being a vehicle containing gelled and ungelled hydrocarbon resins, alkyd resins, wax compounds and aliphatic solvent. The pigment may also be used, for example, at a level of 1 to 10% in an automotive paint formulation along with other pigments which may include titanium dioxide, acrylic lattices, coalescing agents, water or solvents. The pigment may also be used, for example, at a level of 20 to 30% in a plastic color concentrate in polyethylene.

In the cosmetic field, these pigments can be used in the eye area and in all external and rinse-off applications. Thus, they can be used in hair sprays, face powder, leg-makeup, insect repellent lotion, mascara cake/cream, nail enamel, nail enamel remover, perfume lotion, and shampoos of all types (gel or liquid). In addition, they can be used in shaving cream (concentrate for aerosol, brushless, lathering), skin glosser stick, skin makeup, hair groom, eye shadow (liquid, pomade, powder, stick, pressed or cream), eye liner, cologne stick, cologne, cologne emollient, bubble bath, body lotion (moisturizing, cleansing, analgesic, astringent), after shave lotion, after bath milk and sunscreen lotion.

For a review of cosmetic applications, see Cosmetics: Science and Technology, 2nd Ed., Eds: M. S. Balsam and Edward Sagarin, Wiley-Interscience (1972) and deNavarre, The Chemistry and Science of Cosmetics, 2nd Ed., Vols 1 and 2 (1962), Van Nostrand Co. Inc., Vols 3 and 4 (1975), Continental Press, both of which are hereby incorporated by reference.

In order to further illustrate the invention, various non-limiting examples will be set forth below. In these examples, as well as throughout the balance of this specification and claims, all parts and percentages are by weight and all temperatures are in degrees Centigrade unless otherwise indicated.

EXAMPLE 1

A charge of 3–5 grams of platy titanium dioxide having a pearly appearance which had been prepared pursuant to the procedure set forth in Example 1 of U.S. Pat. No. 5,611,851 and being substantially substrate-free was placed in a quartz boat tray and placed in a tube furnace. The furnace was flushed with nitrogen as the tube was heated to 675° C. When that temperature was reached, the nitrogen gas was replaced with ammonia gas for a period of one hour. The resulting pigment was a highly refractive, color pure interference pigment with a dark absorption color.

EXAMPLES 2–7

Example 1 was repeated substituting platy titanium dioxides having gold, orange, red, violet, blue and green appearances. The resulting pigments were highly refractive, color pure interference pigments with a dark absorption color.

EXAMPLE 8

The procedure of Example 1 was repeated except that the temperature of the ammonia reduction was maintained at 800° C. The resulting pigment was opaque and exhibited a good color with a metallic appearance.

EXAMPLE 9

The pigment of Example 1 can be formulated into a powder eye shadow as follows:

The following materials are thoroughly blended and dispersed:

| Ingredients | wt parts |
| --- | --- |
| MEARLTALC TCA ® (Talc) | 18 |
| MEARLMICA ® SVA (Mica) | 20 |
| Magnesium Myristate | 5 |
| Silica | 2 |
| CLOISONNÉ ® Red 424C (red TiO$_2$-coated mica) | 20 |
| CLOISONNÉ ® Violet 525C (violet TiO$_2$-coated mica) | 13 |
| CLOISONNÉ ® Nu-Antique Blue 626CB (TiO$_2$-coated mica/iron oxide-coated mica) | 2 |
| CLOISONNÉ ® Cerise Flambé 550Z (iron oxide-coated mica) | 2 |
| Preservatives & Antioxidant | q.s. |

Then 7 parts of octyl palmitate and 1 part of isostearyl neopentanoate are heated and mixed until uniform, at which time the resulting mixture is sprayed into the dispersion and the blending continued. The blended material is pulverized and then 5 parts of Cloisonne Red 424C and 5 parts of the pigment of example 1 added and mixed until a uniform powder eye shadow is obtained.

EXAMPLE 10

The pigment of Example 1 can be formulated into a lipstick as follows.

The following amounts of the listed ingredients are placed into a heated vessel and the temperature raised to 85±3° C.

| | wt parts |
| --- | --- |
| Candelilla Wax | 2.75 |
| Carnauba Wax | 1.25 |
| Beeswax | 1.00 |
| Ceresine Wax | 5.90 |
| Ozokerite Wax | 6.75 |
| Microcrystalline Wax | 1.40 |
| Oleyl Alcohol | 3.00 |
| Isostearyl Palmitate | 7.50 |
| Isostearyl Isostearate | 5.00 |
| Caprylic/Capric Triglyceride | 5.00 |
| Bis-Diglycerylpolyalcohol Adipate | 2.00 |
| Acetylated Lanolin Alcohol | 2.50 |
| Sorbitan Tristearate | 2.00 |
| Aloe Vera | 1.00 |
| Castor Oil | 37.50 |
| Red 6 Lake | 0.25 |
| Tocopheryl Acetate | 0.20 |
| Phenoxyethanol, isopropylparaben, and butylparaben | 1.00 |
| Antioxidant | q.s. |

Then, 14 parts of the pigment of Example 1 are added and mixed until all of the pigment is well dispersed. Fragrance is added as desired and mixed with stirring. The resulting mixture is poured into molds at 75±5° C., allowed to cool and flamed into lipsticks.

Various changes and modifications can be made in the products and process of the present invention without departing from the spirit and scope thereof. The various embodiments which have been disclosed herein were for the purpose of further illustrating the invention but were not intended to limit it.

What is claimed is:

1. An effect pigment comprising platy titanium dioxide that contains less than 20 weight percent of substrate based on the total weight of said effect pigment and has a surface comprising reduced titanium oxide.

2. The effect pigment of claim 1 comprising a plurality of platelets of about 1 to about 25 μm in maximum dimension and a thickness of about 5 to about 600 nm.

3. The effect pigment of claim 2 wherein said platelets have a maximum dimension of about 2 to about 15 μm and a thickness of about 20 to about 400 nm.

4. The effect pigment of claim 1 wherein said titanium dioxide is in the rutile crystalline form.

5. The effect pigment of claim 1 wherein said titanium dioxide is in the anatase crystalline form.

6. The effect pigment of claim 1 wherein the degree of reduction of the titanium dioxide surface is such that the pigment is opaque.

7. The pigment of claim 1, wherein the degree of reduction of the titanium dioxide surface is such that the pigment is not opaque.

8. A method of preparing a dark titanium dioxide effect pigment comprising providing platy titanium dioxide that contains less than 20 weight percent of substrate based on the total weight of said effect pigment and reducing the surface thereof.

9. The method of claim 8 wherein said platy titanium dioxide has platelets of about 1 to about 25 μm in maximum dimension and a thickness of about 5 to about 600 nm.

10. The method of claim 8 wherein the surface is reduced by contact with a reducing gas.

11. The method of claim 10 wherein the reducing gas is selected from the group consisting of ammonia, hydrogen, a volatile hydrocarbon and mixtures thereof.

12. The method of claim 8 wherein said substrate is removed by subjecting the platelets to an extractive dissolution with a combination of phosphoric acid and a mineral acid.

13. In a paint or ink composition including a pigment, the improvement which comprises said pigment being an effect pigment of claim 1.

14. In a plastic composition including a pigment, the improvement which comprises said pigment being an effect pigment of claim 1.

15. In a cosmetic composition including a pigment, the improvement which comprises said pigment being an effect pigment of claim 1.

16. An automotive paint including a pigment, wherein said pigment is said effect pigment of claim 1.

* * * * *